Oct. 25, 1938.    W. F. ECKERT    2,134,109
GEAR TRANSMISSION
Filed Nov. 28, 1936    4 Sheets-Sheet 1

INVENTOR
WM. F. ECKERT
BY
ATTORNEY

Oct. 25, 1938.  W. F. ECKERT  2,134,109
GEAR TRANSMISSION
Filed Nov. 28, 1936  4 Sheets-Sheet 3

INVENTOR
WM. F. ECKERT
BY
ATTORNEY

Oct. 25, 1938.  W. F. ECKERT  2,134,109
GEAR TRANSMISSION
Filed Nov. 28, 1936  4 Sheets-Sheet 4

INVENTOR
WM. F. ECKERT
BY
ATTORNEY

Patented Oct. 25, 1938

2,134,109

UNITED STATES PATENT OFFICE 2,134,109

GEAR TRANSMISSION

William F. Eckert, Ridley Park, Pa.

Application November 28, 1936, Serial No. 113,126

3 Claims. (Cl. 74—326)

This invention relates generally to change speed gear transmissions particularly adapted for internal combustion engine locomotives.

It is well known that the mechanical transmission of power from an engine to the locomotive wheels through medium of a change speed gear transmission is one of the most difficult problems that designers of small capacity locomotives have been confronted with especially when it is attempted to provide a low cost transmission that is compact, sturdy and efficient in operation. Innumerable attempts have been made in designing transmissions that will meet the foregoing conditions, but such designs have been deficient in that they require excessive space or are too costly or inefficient.

It is one object of my invention to provide an improved combination and arrangement of elements whereby the transmission is extremely compact, sturdy and efficient without sacrifice of the proper size of gears, clutches, bearings and number of bearing supports.

Other objects and advantages will be more apparent to those skilled in the art from the following description of the accompanying drawings in which.

Figure 1:
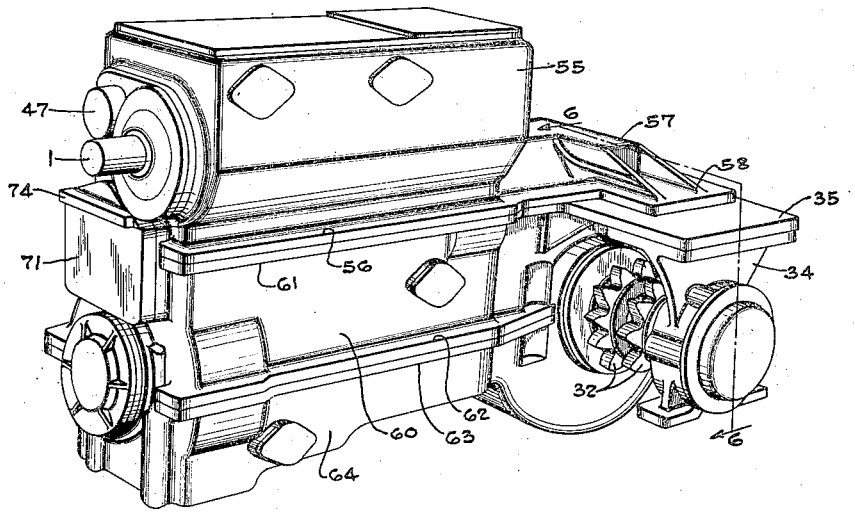
Fig. 1 is a perspective of the complete transmission viewed from the driven end.
Figure 2:
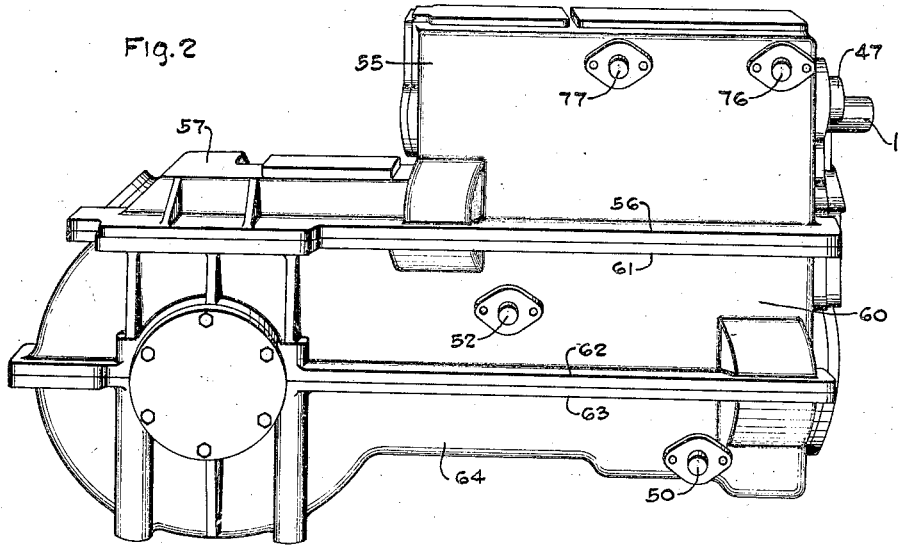
Fig. 2 is a perspective of the complete transmission viewed from the opposite side of Fig. 1.

In the particular embodiment of the invention which is shown herein merely for the purpose of illustrating one specific form among possible others that the invention might take in practice, I have provided a driving shaft 1 (Fig. 5) adapted for connection either directly or through a clutch to the drive shaft of an internal combustion engine or other suitable prime mover. This shaft is journalled in suitably held bearings generally indicated at 2 and 3, it being noted that bearing 3 is mounted in a support 4 depending from the top of the gear housing generally indicated at 5. Rotatably journalled on shaft 1 is a reverse driving pinion 6 and a forward driving pinion 7 adapted alternatively to be clutched to shaft 1 through suitable gear type clutch rings 8 and 9 whose internal teeth are complemental to, and respectively receive, the teeth of gears 6 and 7. The clutches are suitably splined to shaft 1. Inasmuch as the general and detailed structure of the transmission can be more briefly and clearly described in connection with the various gear speeds, the latter will be taken up in order.

Figure 3:
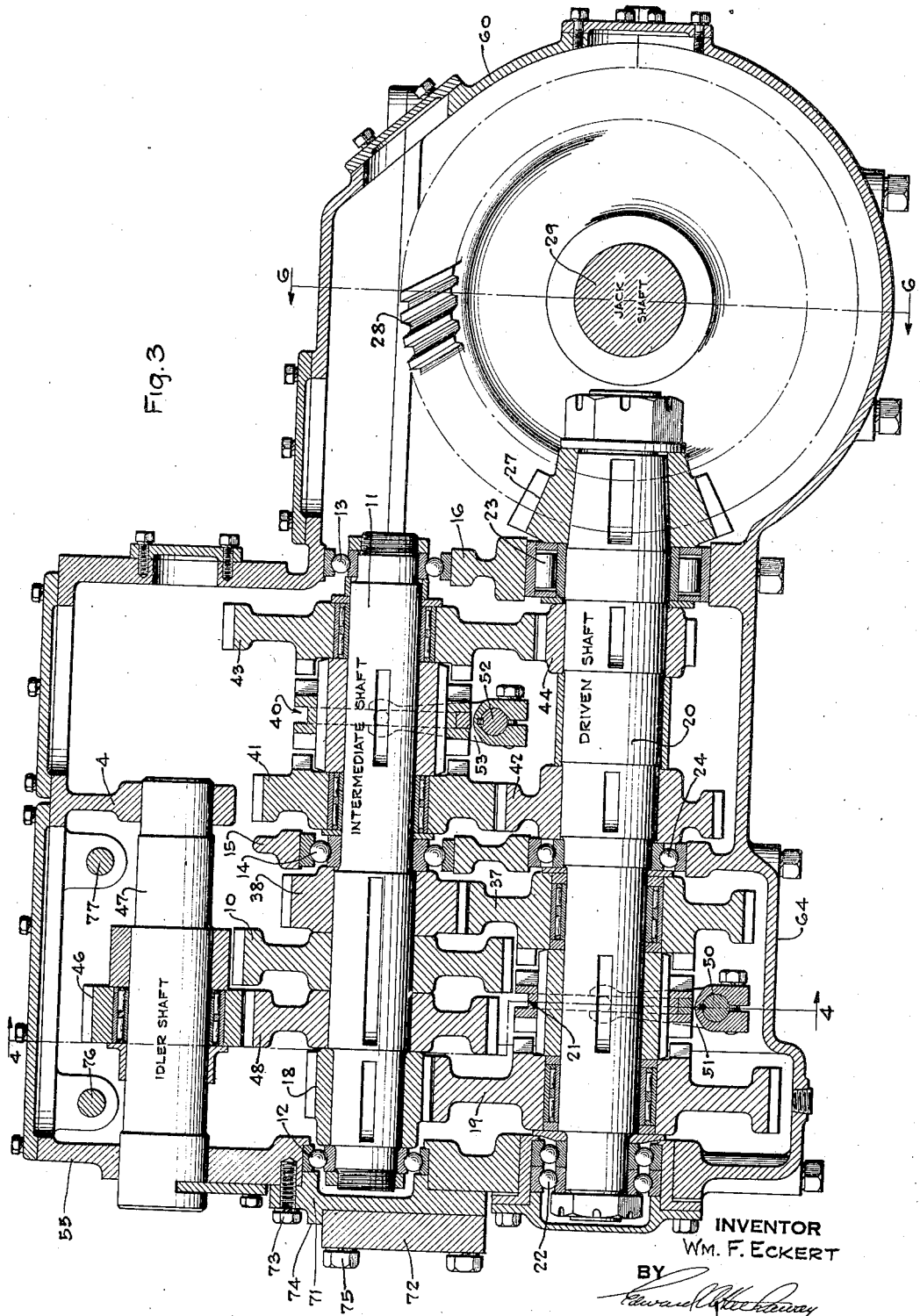
Fig. 3 is a vertical longitudinal section taken substantially on the line 3—3 of Fig. 4.
Figure 4:
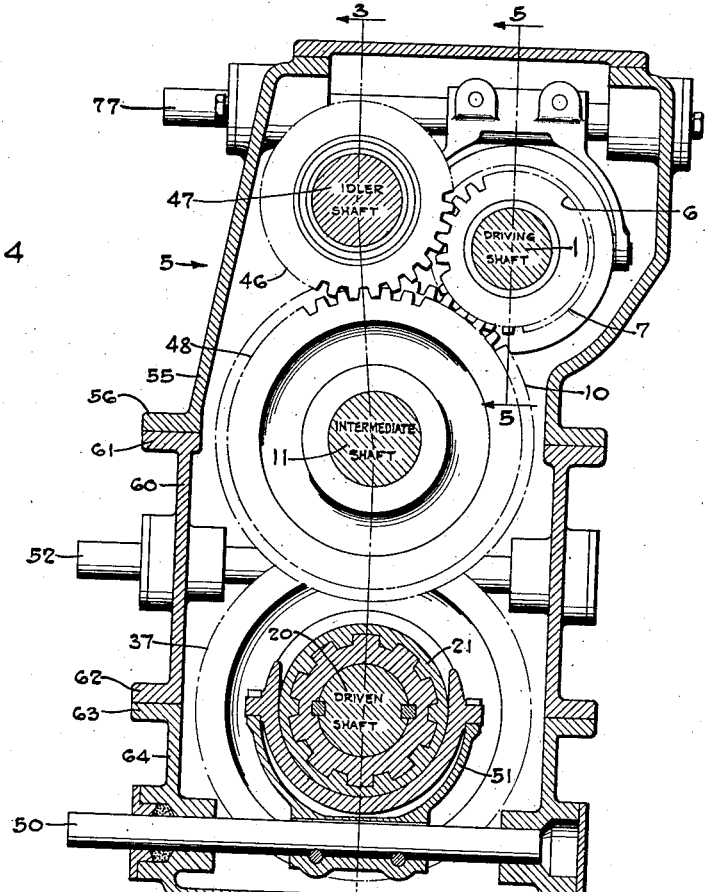
Fig. 4 is a transverse section taken on line 4—4 of Fig. 3.
Figure 6:
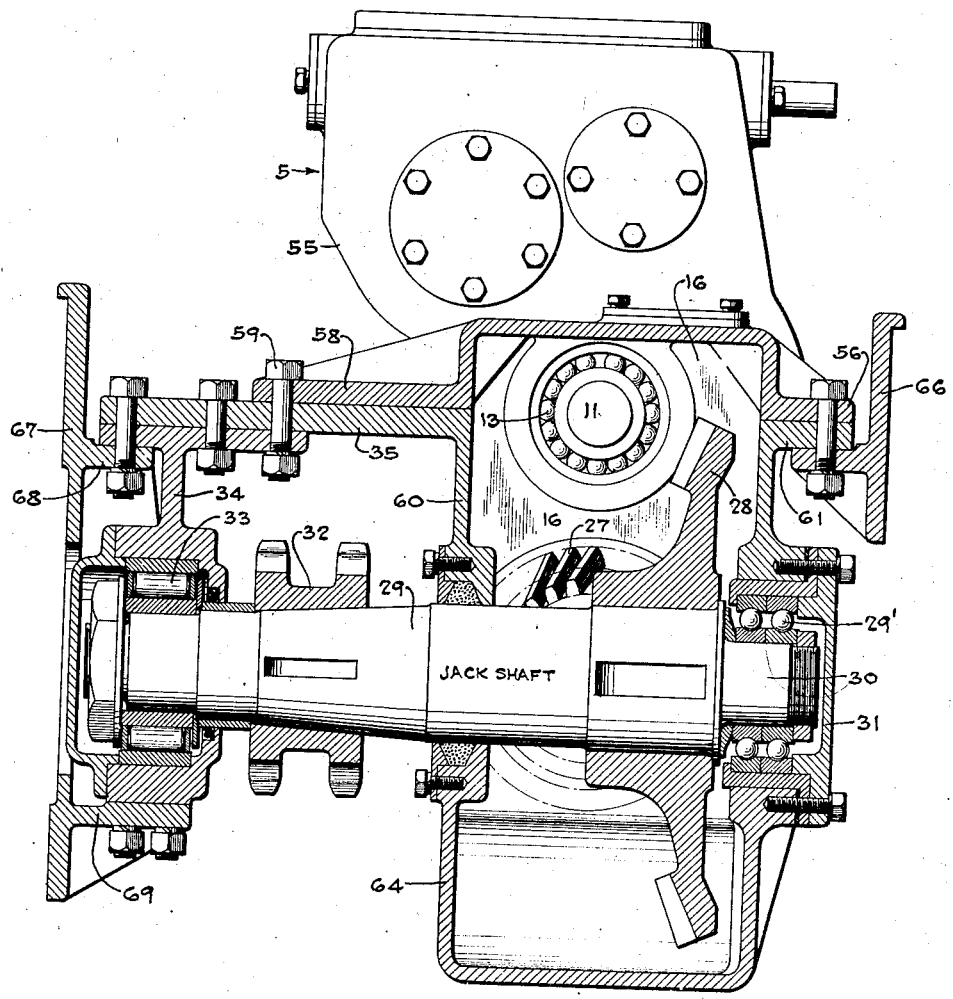
Fig. 6 is a vertical transverse section taken on the line 6—6 of Figs. 3 and 1.

*First speed forward.*—Driving pinion 7 as shown in Fig. 4 meshes directly with an initial driving gear 10 which as shown in Fig. 3 is keyed to an intermediate driving shaft 11. This shaft is journalled at its ends in bearings 12 and 13 and at the intermediate point by a bearing 14, a suitable partition or vertical wall 15 being provided to support bearing 14 while another vertical wall 16 supports bearing 13. Shaft 11 transmits its power through a pinion 18 meshing with a gear 19 which is freely journalled on a third shaft 20 herein referred to as the driven shaft. Gear 19 is adapted to be connected to shaft 20 through a usual shiftable clutch generally indicated at 21. Shaft 20 is journalled in end bearings 22 and 23 and in intermediate bearing 24, bearings 23 and 24 being supported in the vertical walls 15 and 16. Shaft 20 drives a bevel pinion 27 meshing with a bevel gear 28 which is secured to a main transverse jack-shaft 29 located to the rear of the transmission. This jackshaft as shown in Fig. 6 is peculiarly arranged so that bevel gear 28 is located at the inner heavy end of the shaft adjacent to which a large capacity frictionless bearing 29' is located upon a reduced stub portion 30 of the jackshaft. A cover 31 holds the bearing in position and is of such size as to permit removal of the jackshaft through the opening closed by the cover. The other end of the jackshaft projects outwardly through one side of the gear case and a sprocket 32 is keyed to the shaft. The outer end of the jackshaft is journalled in a bearing 33 supported in a dependent bracket 34 which is preferably bolted or otherwise suitably secured to a horizontal shelf bracket 35 formed with the gear case. Any suitable driving chain or chains connect sprockets 32 with the driving axle of the locomotive in a manner that is well known in the art.

*Second speed forward.*—This is obtained by disengaging clutch 21 from gear 19 and engaging clutch 21 with gear 37 which is journalled upon the main shaft 20. Power thereupon flows from shaft 1 through gear 7, Fig. 4, to gear 10, shaft 11, pinion 38 keyed to shaft 11 and thence to gear 37 meshing with gear 38, shaft 20 and bevel gears 27 and 28 to jackshaft 29.

*Third speed forward.*—Clutch 21 is placed in neutral and a clutch 40 is shifted to the left to connect a gear 41 to shaft 11, this gear otherwise being freely rotatably journalled on said shaft. Power is thereupon transmitted from the engine propelled shaft 1, Fig. 4, through gears 7 and 10, thence through shaft 11, Fig. 3, gear 41 and a gear 42 meshing therewith and keyed to shaft 20 to drive the bevel pinions 27 and 28 and jackshaft 29.

*Fourth speed forward.*—Clutch 40 is engaged with a gear 43 normally freely journalled on shaft 11 thereby to cause power to be propelled from the engine driven shaft 1 through gears 7 and 10, shaft 11, gear 43 meshing with a gear 44 keyed to shaft 20 and thence through shaft 20 to the bevel gears and jackshaft 29.

Figure 5:
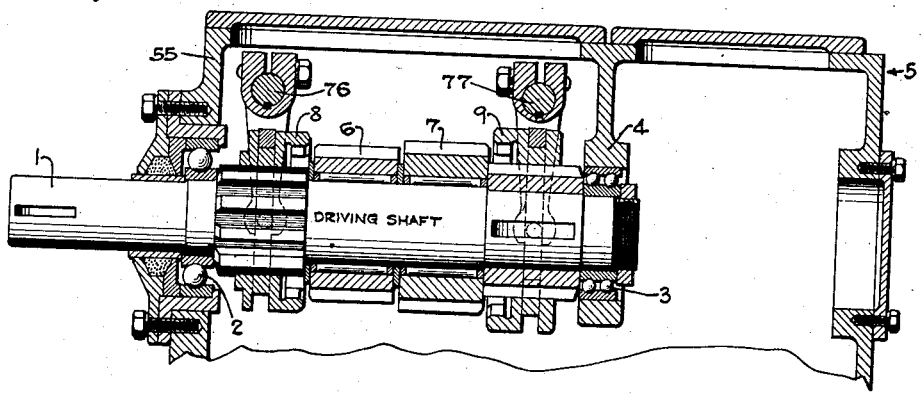
Fig. 5 is a vertical longitudinal section taken on the line 5—5 of Fig. 4.

*First speed reverse.*—Forward speed clutch 9, Fig. 5, is disengaged and reverse clutch 8 is engaged with gear 6 which as shown in Fig. 4 meshes with a gear 46. This gear 46 as shown in Figs. 3 and 4 is normally freely journalled on a reverse idler shaft 47. This shaft as shown in Fig. 4 is located to one side of and substantially parallel to engine driven shaft 1 and is suitably journalled in the casing including dependent bearing support 4. Gear 6 drives gear 46 to in turn transmit power through a gear 48 meshing therewith and keyed to shaft 11 from which the power is transmitted through any one of the four speeds heretofore described merely by shifting the clutches 21 or 40 to their selected positions.

From the foregoing disclosure of the several gear trains, it is seen that an extremely compact, simple and yet highly rugged change speed gear transmission is provided. For example, gears 10 and 48 are located between gears 19 and 37, whereby it is possible to take advantage of this spacing to provide for clutch 21. Due to the relative size of the set of gears 10 and 48 as compared to the set of gears 19 and 37, it is seen that the gears 10 and 48 are adapted to have their peripheries lie in relatively close relation to clutch 21 while the clutch shifting mechanism including the transverse shaft 50 and shipper yoke 51 are adapted to be disposed beneath clutch 21 without in any way enlarging the transmission case to house the same. Similarly the size of the gears 41 and 43 compared to the gears 44 and 42 permits a clutch shipper mechanism including a transverse shaft 52 and shipper yoke 53 to be compactly located beneath clutch 40.

*Casing.*—This arrangement is in combination with providing ample end and intermediate bearing supports for the second and third shafts 11 and 20 respectively while the arrangement of the change speed gears together with the bevel gears 27 and 28 is such that a gear case of minimum weight may be provided. As shown in Fig. 1, the engine driven shaft 1 and idler shaft 47 are located in a gear case section 55 having its lower edge provided with a flange 56 while the rearmost portion of said case terminates in a bevel gear cover portion 57. This cover portion also extends laterally as at 58, Figs. 1 and 6, to reinforce the horizontal shelf bracket 35 and also preferably to overlie a portion of the bracket 34 so that all three members may be commonly connected by a bolt 59. An intermediate gear case section generally indicated at 60 has an upper flange 61 mating with a flange 56 to be secured thereto by bolts while mating flanges 62 and 63 are formed respectively on the lower edge of section 60 and on the upper edge of a lower gear case section 64 to be bolted together in any usual manner. The flanges 56 and 61 lie in the plane of the axis of shaft 11 while flanges 62 and 63 lie in the plane of the axis of shafts 20 and 29.

It is also seen from the disclosure herein that the jackshaft end of the transmission may be rigidly connected to the locomotive frame through any supplemental brackets such as 66 secured to the underside of flanges 56 and 61 while a bracket 67 is provided with flanges 68 and 69 bolted to the under side of shelf 35 and to the lower end of bearing bracket 34. To support the front end of the transmission, I provide a plate 71 performing the dual functions of a cover for bearing 12 and a support for any suitable transverse frame supporting member diagrammatically indicated at 72, Fig. 3. The plate is secured to the gear case by bolts 73 while the cover has a flange 74 supported on frame member 72 which in turn is secured to the gear case by bolts 75.

Thus it is seen that this general arrangement permits the main body of a gear transmission to be located in such a horizontal plane that a minimum portion thereof, such as the upper gear case section 55, projects into the cab portion of the locomotive. Hence minimum space is required combined with maximum adaptability for connecting gear shift levers to the ends of the clutch shifting shafts 50, 52 and to the forward and reverse clutch shifting shafts 76 and 77, Fig. 5.

It will of course be understood that various changes in details of construction and arrangement of parts may be made by those skilled in the art without departing from the spirit of the invention as set forth in the appended claims.

I claim:

1. A gear transmission comprising, in combination, a driving shaft having a driving pinion, an intermediate shaft having an initially driven gear keyed thereto and meshing with said driving pinion, a pair of gears keyed to said intermediate shaft and located one on each side of said initially driven gear, a third shaft having gears freely journalled thereon and meshing respectively with said pair of gears, a clutch for alternatively connecting said freely journalled gears to said third shaft, a bevel pinion keyed to the end of said third shaft, a transverse jackshaft having a bevel gear meshing with said bevel pinion, an idler shaft having an idler gear freely journalled thereon, a reverse driving pinion on said main driving shaft meshing with said idler gear, and a gear secured to said intermediate shaft between said first pair of gears thereon and meshing with said idler gear whereby said gears which are secured to said intermediate shaft between said first set of gears thereon overlie the clutch for connecting the gears which are freely journalled on said third shaft.

2. A gear transmission comprising, in combination, a driving shaft having a driving pinion, an intermediate shaft having an initially driven gear keyed thereto and meshing with said driving pinion, a pair of gears keyed to said intermediate shaft and located one on each side of said initially driven gear, a third shaft having gears freely journalled thereon and meshing respectively with said pair of gears, a clutch for alternatively connecting said freely journalled gears to said third shaft, a bevel pinion keyed to the end of said third shaft, a transverse jackshaft having a bevel gear meshing with said bevel pinion, an idler shaft having an idler gear freely journalled thereon, a reverse driving pinion on said main driving shaft meshing with said idler gear, and a gear secured to said intermediate shaft and meshing with said idler gear.

3. A gear transmission comprising, in combination, a driving shaft having a driving pinion, an intermediate shaft having an initially driven gear keyed thereto and meshing with said driving pinion, a pair of gears keyed to said intermediate shaft and located one on each side of said initially driven gear, a third shaft having gears freely journalled thereon and meshing respectively with said pair of gears, a clutch for alternatively connecting said freely journalled gears to said third shaft, a bevel pinion keyed to the end of said third shaft, a transverse jackshaft having a bevel gear meshing with said bevel pinion, an idler shaft having an idler gear freely journalled thereon, a reverse driving pinion on said main driving shaft meshing with said idler gear, and a gear secured to said intermediate shaft and meshing with said idler gear, means for freely journalling both of said driving pinions on said driving shaft, and a clutch mechanism for alternatively connecting said driving pinions to said driving shaft.

WILLIAM F. ECKERT.